United States Patent [19]

Retallack et al.

[11] Patent Number: 4,647,728
[45] Date of Patent: Mar. 3, 1987

[54] PROGRAMMING SWITCH ASSEMBLY FOR COMMUNICATION TERMINALS

[75] Inventors: Laurence J. Retallack; Gerd Kuhfus, both of London, Canada

[73] Assignee: Northern Telecom Limited, Montreal, Canada

[21] Appl. No.: 674,656

[22] Filed: Nov. 23, 1984

[30] Foreign Application Priority Data

Aug. 21, 1984 [CA] Canada .................................... 461451

[51] Int. Cl.⁴ .............................................. H01H 9/00
[52] U.S. Cl. ..................................... 200/5 R; 200/46; 200/264
[58] Field of Search ..................... 200/5 R, 5 A, 16 R, 200/46, 159 B, 264, 340, 6 R; 338/9.9, 114; 179/90 B, 90 BD, 90 K, 99 LS, 158 R

[56] References Cited

U.S. PATENT DOCUMENTS

| | | | |
|---|---|---|---|
| 3,509,296 | 4/1970 | Harshman et al. | 200/264 X |
| 3,898,421 | 8/1975 | Suzumura | 200/5 A X |
| 4,025,743 | 5/1977 | Oswald | 200/16 R X |
| 4,114,000 | 9/1978 | Feder | 200/16 D |
| 4,117,292 | 9/1978 | Hayes et al. | 200/5 A X |
| 4,119,823 | 10/1978 | Matsueda et al. | 200/6 R X |
| 4,441,001 | 4/1984 | Miyano et al. | 200/5 A X |
| 4,486,637 | 12/1984 | Chu | 200/5 A X |
| 4,491,702 | 1/1985 | Kato | 200/5 A |

Primary Examiner—J. R. Scott
Attorney, Agent, or Firm—Sidney T. Jelly

[57] ABSTRACT

Programming of a communications terminal is carried out by insertable programming members carrying a plurality of actuators. Each actuator has at least one and usually two actuating members which engage with a circuit to modify the electrical characteristics of the circuit. The actuating members themselves may contact conductor paths, connecting them selectively to a ground conductor, or interconnecting two conductor paths. The actuating members may actuate indirectly through an intermediate member. Actuating members can be at predetermined different positions along an actuator. Typically one programming member is associated with a push-button, the programming member, for example having two columns of four actuators. On depressing the push-button, the particular coding is rapidly scanned by the electronic circuitry and the particular service associated with that code is provided.

25 Claims, 19 Drawing Figures

PROGRAMMING SWITCH ASSEMBLY FOR COMMUNICATION TERMINALS

BACKGROUND OF THE INVENTION

This invention relates to a means for programming communications terminals and in particular relates to programming means which are positioned, and removed, by the user of the terminal. The invention also relates to a terminal incorporating such programming means.

Terminals for communications systems extend from a relatively conventional telephone set to a complex terminal having voice and data and other features. Such terminals can be arranged to provide a variety of services. Different services can be required by different users and a single user can require a variation in the services required at different times. Normally a terminal has a specified selection of services allocated to it, each accessed by a particular sequence of key pad actuation. The invention provides a changeable programming means whereby only the actuation of a single key is necessary to access a particular service. Changing the programming means changes the service accessed by the related key. This avoids the need to remember keying codes.

SUMMARY OF THE INVENTION

In its broadest aspect the invention provides a means for programming a terminal, by means of a self-contained device easily and quickly inserted and removed. A labelling function is normally associated with the device to indicate the particular feature accessed.

The invention comprises an insertable member having means thereon for affecting the condition of a circuit by making, or breaking connections. The member can have permanent actuators thereon or the actuators can be removable in the member. The actuation can vary considerably in form and in method of actuation.

In a particular form of the invention, programming members are insertable into and removable from a frame mounted in the terminal. The members have a plurality of actuators mounted therein, the actuators having actuating members which have a predetermined positional relationship, which can be varied for each actuator and also varied from one actuator to another. Typically the actuating members make contact with a circuit on a circuit board, but can also act indirectly.

BRIEF DESCRIPTION OF THE DRAWINGS

The invention will be readily understood by the following description of an embodiment of the invention and of variations in and modifications to the described embodiment, in conjunction with the accompanying drawings, in which.

DETAILED DESCRIPTION

Figure 1:
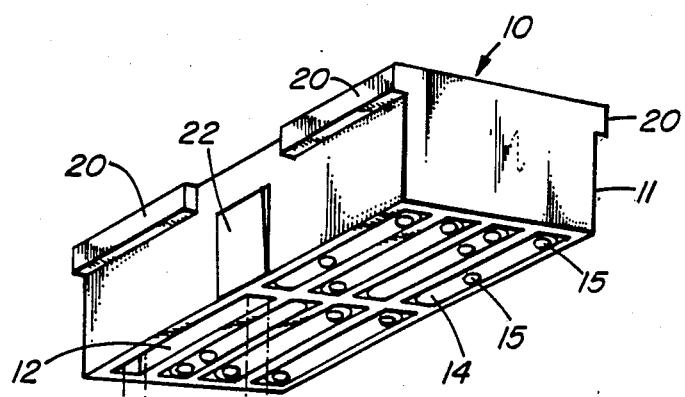
FIG. 1 is a perspective view of one form of programming member in accordance with the invention.
Figure 2:
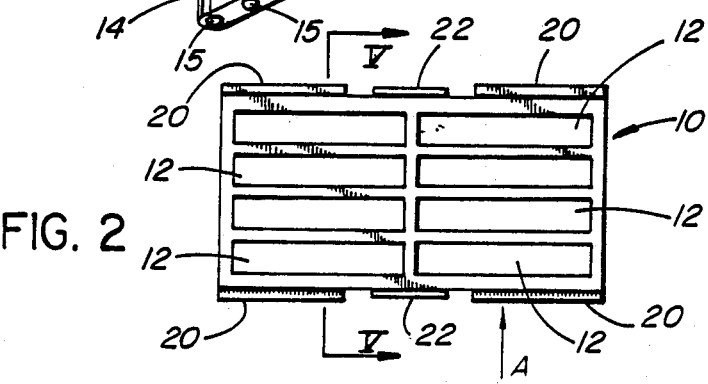
FIG. 2 is a bottom plan view of the basic member.
Figure 3:
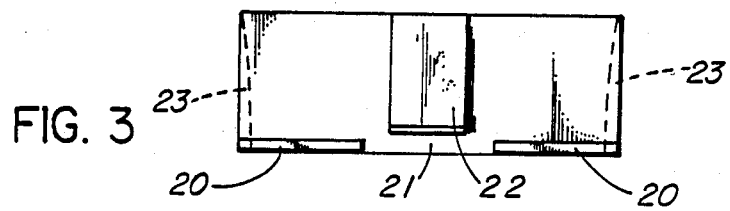
FIG. 3 is a side view in the direction of arrow A in FIG. 2.
Figure 4:
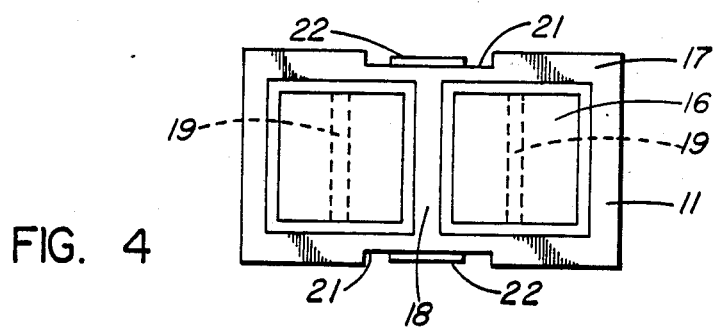
FIG. 4 is a top plan view of the member of FIG. 2.
Figure 5:
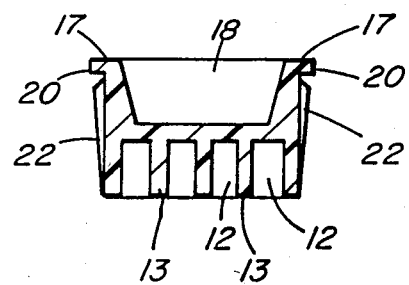
FIG. 5 is a cross-section on the line V—V of FIG. 2.
Figure 6A:
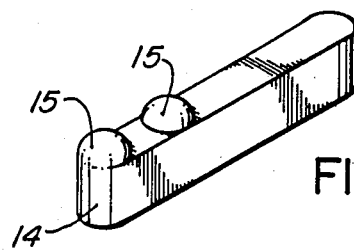
FIGS. 6a, 6b, 6c and 6d illustrate four alternative inserts for the member of FIGS. 2 to 5.
Figure 6B:
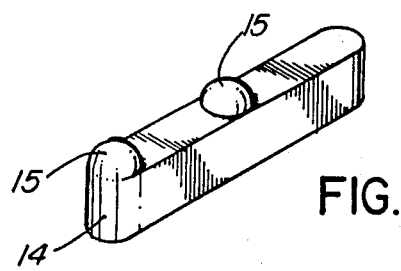
Figure 6C:
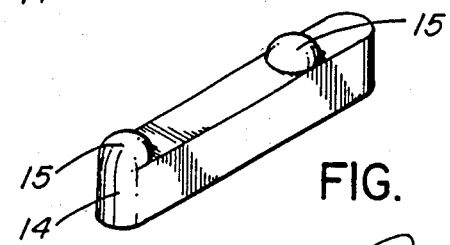
Figure 6D:
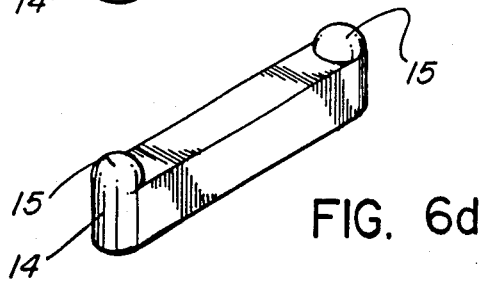
Figure 7:
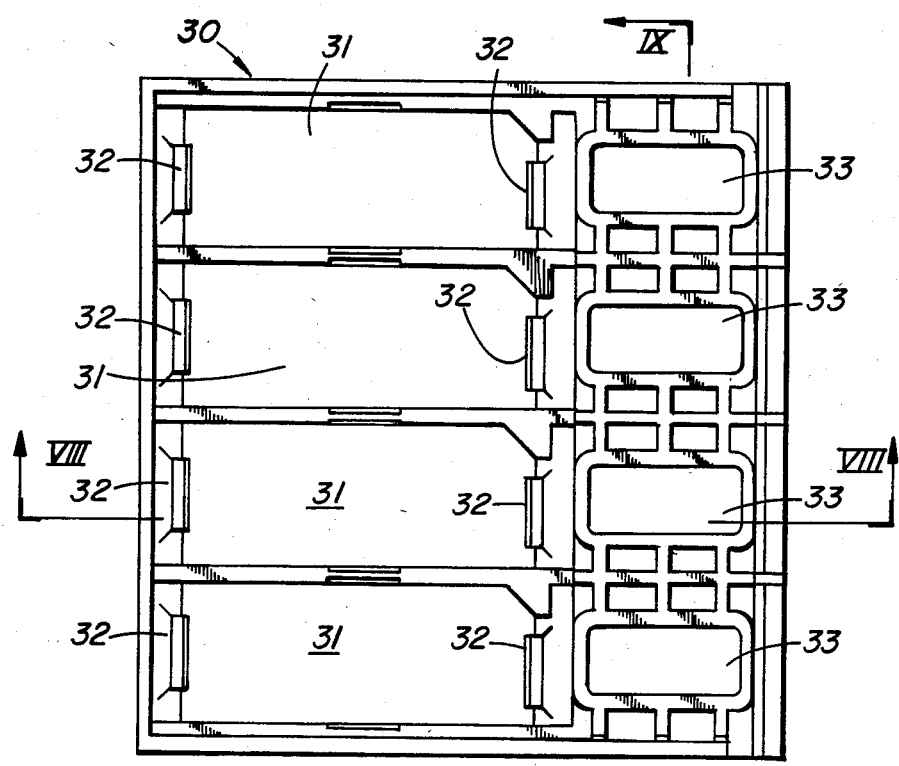
FIG. 7 is a top plan view of a frame which is mounted in a terminal to accept programming members as in FIG. 1.
Figure 8:
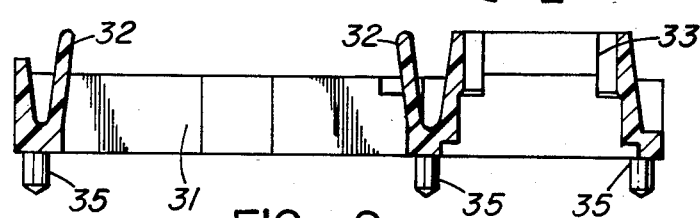
FIG. 8 is a cross-section on the lines VIII—VIII of FIG. 7.
Figure 9:
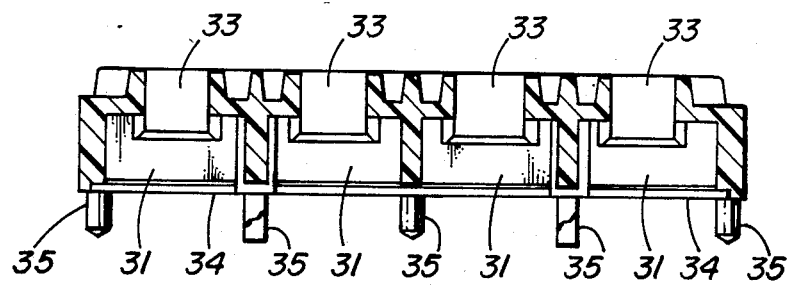
FIG. 9 is a cross-section on the line IX—IX of FIG. 7.
Figure 10:
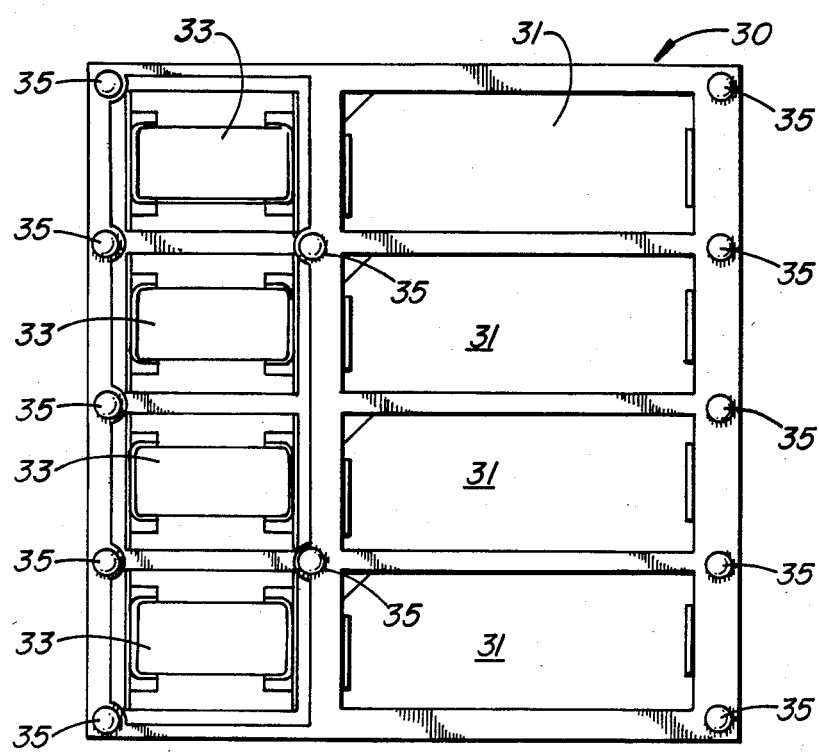
FIG. 10 is a bottom plan view of the frame.

As illustrated in FIG. 1, and in FIGS. 2 to 5, a programming member 10 comprises a rectangular body portion 11 having eight elongate recesses 12 formed therein, the recesses extending inward from a bottom surface 13. The recesses are arranged in two groups of four. Positioned in the recesses 12 are actuators 14. Each actuator 14 has two protrusions forming actuating members 15. The relative positions of the actuating members 15 on an actuator 14 can vary, as illustrated in FIG. 6. By selection of particular actuators, a particular pattern of actuator members for a programming member can be provided. The actuators 14 can be removable in the programming member 10.

The particular shape of the programming member 10, the number and size of recesses 12 and actuators 14, and number and positioning of actuating members 15 can be varied. The basic arrangement is that a variable arrangement of actuating members 14 can be provided for cooperation with a circuit board. In the example, the actuators 14 and actuating members 15, are of electrically conducting silicone material and act to electrically connect contact positions on the circuit board to give particular circuit arrangements.

The body portion 11 has, in the example, two recesses 16 extending in from the top surface 17. These recesses merely reduce the amount of material used. The top surface 17, including the surface of central rib 18, act as a support surface to which is attached a label which indicates what particular service is provided by the programming member. If desirable, or necessary, additional ribs can be provided, as indicated in dotted form at 19.

Small ledges 20 extend from the two sides of the body portion. A gap 21 extends between the two ledges on a side, and a shallow wedge-shaped protrusion 22 extends from the side wall on each side. The protrusions 22 extend from the bottom surface 13 being inclined outwardly. The ends of the body portion can be inclined, upwardly and outwardly from the bottom surface 13, as indicated in dotted outline at 23.

The programming members in the particular embodiment illustrated, are positioned in a frame which is mounted in a terminal. The frame provides positions for holding programming members and also provides positions for keys or push-buttons, although this latter feature can be omitted, the frame only holding programming members.

FIGS. 7, 8, 9 and 10 illustrate one form of frame 30 which holds four programming members and also has positions for four keys or push-buttons, one key for each programming member. The frame 30 has four elongate apertures 31 of a size to accept a programming member as in FIG. 1. At each end of each aperture 31 is a cantilevered member 32. These members 32 deform or bend slightly as a programming member is inserted to hold the member in position. Four further apertures 33 are provided, an aperture 33 aligned with each aperture 31. Keys are positioned in the apertures 33. Extending from a bottom surface 34 of the frame are cylindrical projections 35. These pass through holes in a circuit board and are deformed over at their ends after assembly of the frame to the circuit board, to hold frame and circuit board assembled. It would be possible to provide hollow bosses instead and insert screws through the circuit board into the bosses.

Figure 11:
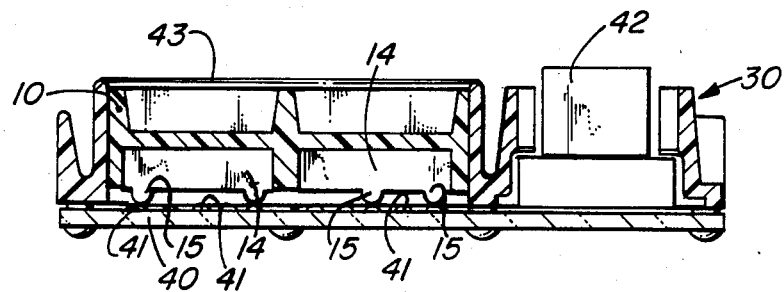
FIG. 11 is a cross-section similar to that of FIG. 8 with the frame attached to a circuit board and a programming member in position.
Figure 16:
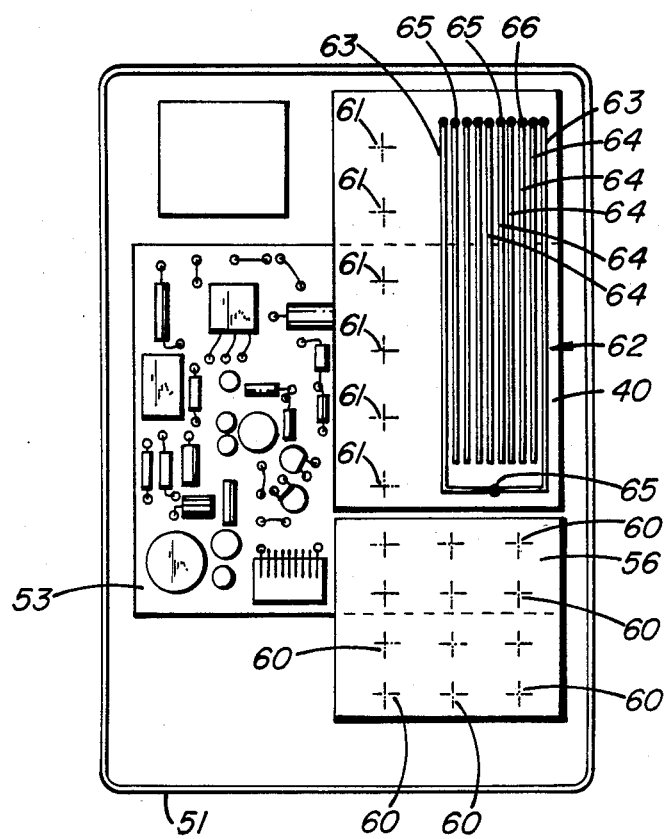
FIG. 16 is a top view of the telephone set base of FIGS. 14 and 15 with the top housing and programming member frame removed.

FIG. 11 illustrates the frame 30 mounted on a circuit board 40. Programming member 10 is shown positioned on aperture 31, with actuators 14 in the member 10. The actuating members 15 make contact with contact areas 41 on the circuit board 40. Contact areas 41 are in a circuit pattern on the circuit board, as illustrated in FIG. 16. A key or push-button is also shown at 42. In the example the key 42 and associated contact members are mounted on the circuit board 40. If desired the keys can be mounted on a separate board. Also shown in FIG. 11 is a label at 43, on the top surface of the member 10.

The contact areas 41 are part of a circuit pattern which connects to electronic components and associated circuitry which will provide particular services. Using one such service as an example, a programming member 10 can have actuators 14 with actuating members 15 making electrical connections such that call forwarding will automatically be provided once the associated key has been depressed. An alternative is that electrical connections are made such that, on depression of the key, a particular code sequence is automatically dialed. Other services such as connection of a fire alarm, burglar alarm to the terminal with automatic dialing of an alarm number on actuation of the alarm. Many other services can be provided.

Figure 12:
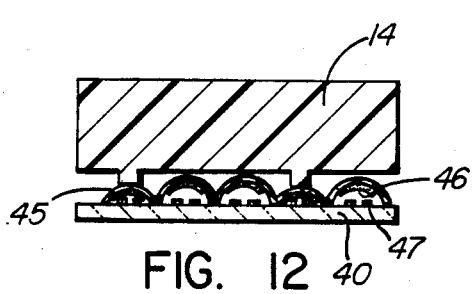
FIG. 12 illustrates diagrammatically an alternative form of actuator.
Figure 13:
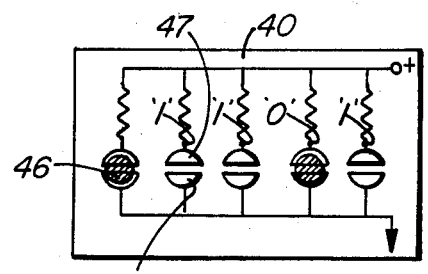
FIG. 13 illustrates diagrammatically one form of contact areas on a circuit board.

Alternate forms of actuators, and actuating members can be provided. Thus, for example, instead of the actuating members 15 making contact themselves, they can depress an elastomeric member to make contacts. This is illustrated diagrammatically in FIG. 12. The elastomeric member is indicated at 45, with contact portions at 46. When depressed by the actuating members the contact portions 46 make contact with contact areas 47 on the circuit board 40. In this example, the contact portions connect two immediately adjacent contact areas. This is indicated diagrammatically in FIG. 13. In the example, illustrated in FIG. 13, the interconnection or non-connection of pairs of contact areas 47 can be arranged to give digital or logic outputs, that is as "zeros" or "ones". This form of output can be provided for othe forms of actuators. One actuator 14 is shown in FIG. 12 and a board with a contact area for one actuator is shown in FIG. 13. These are examples only and normally a plurality of actuators would be provided with a larger circuit board 40. However, the number of actuators per programming member, the number of actuating members 15 on an actuator 14, and the number of programming members can be varied to suit requirements.

The connection of pairs of contact areas, as in FIG. 13, can be by an elastomer with contact members as in FIG. 12. Alternatively the actuating members themselves can make contact with the contact areas. Other arrangements are miniature rocker switches on the circuit board, actuated by actuator members. Cantilever spring contact switches can also be used. The actuating members can enter holes in the circuit board and make connections with plated contact areas in the holes.

Figure 14:
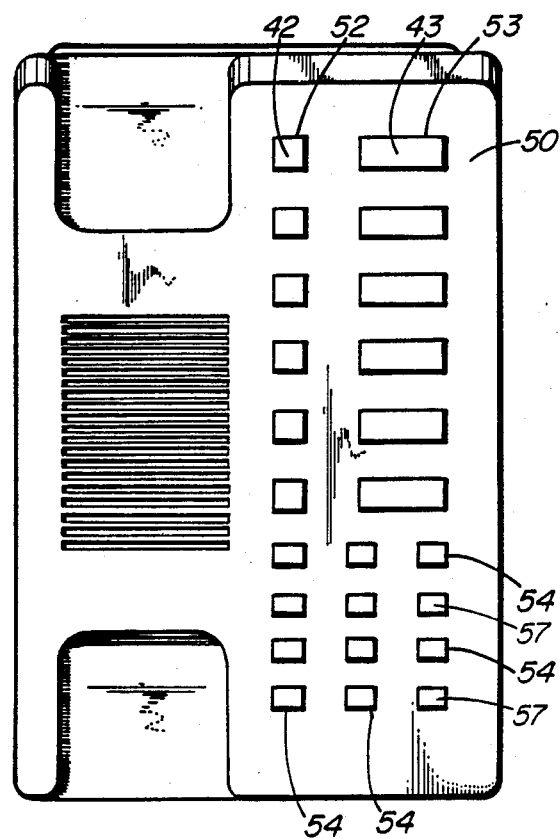
FIGS. 14 and 15 are top and side views respectively of one form of telephone set base.
Figure 15:
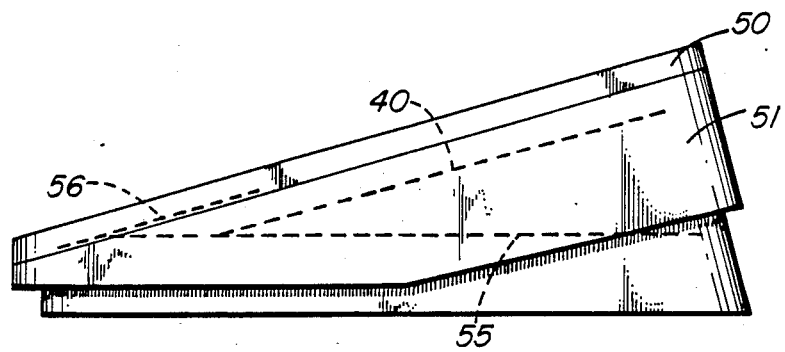

FIGS. 14 and 15 illustrate, in top plan view and side view an example of a telephone set base incorporating the invention. In FIG. 14 the top housing 50 is seen and in FIG. 15, the top housing 50 and bottom housing 51. In FIG. 14 the top housing has apertures 52 for the buttons 42 and apertures 53 for the programming members 10. Normally the programming members would be flush with the top housing, with the labels 43 showing. Apertures for the dial push-buttons 57 are at 54.

Indicated in FIG. 15, is a main circuit board, in dotted outline at 55, a circuit board for the dial, in dotted outline at 56, and the circuit board for the programming members, indicated in dotted outline at 40. Connection between circuit boards 40 and 56 and board 55 can be by a flexible flat cable or other means.

FIG. 16 is a top plan view of the bottom housing 51, with the top housing removed. Also the frame 30 for the programming members 10 is removed from circuit board 40 to show the conductor pattern particularly for the programming members. The switch positions for the push-buttons 57 are indicated at 60, on the small circuit board 56. The switch positions for the push-buttons 42 are indicated at 61 on circuit board 40. The switch positions may be part of a circuit pattern on the top surfaces of the circuit boards 40 and 56, or may be connected to a circuit pattern on the bottom surfaces of the circuit boards. Also formed on the circuit board 40 is a circuit pattern, indicated generally at 62, for the programming members. Each actuator in the example illustrated, has one actuating member at one end and one actuating member which can be at any one of four positions. It is arranged that, for each push-button 42, there are two actuators and these actuators are positioned in the programming member so that the outer, fixed position, actuating member is at an extremity on the other of the programming member. Thus there are two fixed positions, between which there are eight variable positions. Ten paths are provided on the circuit board 40, in the circuit pattern 62, and indicated at 63 for the outer or fixed positions and at 64 for the variable positions. The outer paths are connected to ground and conveniently are joined at one end and connect to a common ground connection at 65. At 66 are shown connections to the electronic circuitry in the telephone. The particular arrangement of the paths 64, and the number of paths, can vary depending upon the number and arrangement of actuating members.

The paths 64 are connected to circuit members, not shown, which can be mounted on the bottom surface of circuit board 40 or on the circuit board 55, or some other circuit board if desired. Depending upon the particular contacts made by the actuating members 15 on an actuator 14, different features, or services are selected on pushing the buttons 42.

The number of paths can be varied with variation in the number of actuating member positions. Thus, in the example as illustrated and described ten paths provide for ten positions. With two paths connected to ground, eight variable positions are provided. While ground connections will normally be provided, it is not essential. Also more or less than five actuating members can be provided on an actuating member. The actuators 14, are, in this example, of electrically conducting material. Thus selected paths 64 are connected to ground. This in effect sets up a ground status for these paths. When the push-button 42 associated with a particular pair of actuators is depressed, the electronic circuitry in the telephone set scans very rapidly the conditions of the paths 64. The actuating members 15 effectively set up a code which is bi-polar, or digital form. The particular code, or digital form will result in a particular programme or service being accessed, such as dialing a particular number, call forwarding and the like.

Use of non-conducting actuators would require a pair of paths for each actuating member, with the actuating member connecting the two paths together—the actuating member itself being electrically conductive. Such an arrangement can also give a digital form of output, as described in relation to FIGS. 12 and 13, or could be used to connect particular components, or circuit parts, to give predetermined particular services.

The number of actuators provided in a programming member can vary, but normally, with five actuating members on an actuator, two columns of five actuators is a very convenient and effective arrangement. Only one column of actuators could be provided. Also the number of actuating members on an actuator can be varied. However, the actual arrangement provided will depend on the number of different services required and the space available in the terminal.

In use a person requiring a service can either select a programming member already assembled with actuators giving the required connection arrangement, or they can assemble their own member by inserting the necessary actuators in accordance with information supplied. The user then makes a notation on a label and affixes it to the programming member and positions the programming member in the frame. The services provided would normally be charged for by the telephone company, usually on a rental basis. It can be arranged that insertion of the programming member automatically sends a signal to an office or registering center such as a computer, to indicate that a particular service has been selected.

What is claimed is:

1. A programming system for a communications terminal having a programmable circuit pattern with a plurality of actuation points for altering the operation of said circuit pattern, said programming system including a programming member having top and bottom into said member from said bottom surface; removable actuators positioned in said recesses; a plurality of actuating members on each actuator, said actuating members being positioned at preselected ones of a plurality of positions on each actuator said positions corresponding to certain ones of said plurality of actuation points such that said actuating members cause said circuit pattern to be programmed to perform predetermined operations; and means for releasbly retaining said member in said terminal.

2. A programming system as claimed in claim 1, said recesses arranged in columns and rows.

3. A programming system as claimed in claim 2, said recesses arranged in two colums.

4. A programming system as claimed in claim 2, said recesses arranged in four rows.

5. A programming system as claimed in claim 1, said actuating members being of conductive material and positioned to contact said circuit pattern.

6. A programming system as claimed in claim 5, said circuit pattern comprising a plurality of parallel paths, an actuating member being positioned to contact one of said paths.

7. A programming system as claimed in claim 6, each of said paths comprising a single conductor path, and further including a path connected to ground, said actuators and actuating members being of conductive material, at least one of said actuating members on each actuator positioned to contact said path connected to ground and at least one of said actuating members on each actuator being positioned to contact a preselected one of said conductor paths.

8. A programming system as claimed in claim 7, said actuators arranged in columns and rows and said circuit pattern comprising a plurality of parallel paths, each of said paths comprising a single conductor path, one of said conductor paths associated with each column of actuators being connected to a ground terminal and an actuating member on each actuator positioned to contact said one of said conductor paths, and a preselected other actuating member on each actuator positioned to contact a preselected other one of said conductor paths.

9. A programming system as claimed in claim 1, including a push-button associated with said programming member to cause said circuit pattern to perform the function programmed by the programming member.

10. Programming system for a communications terminal having a programmable circuit pattern with a plurality of contact points for altering the operation of said circuit pattern, comprising:
a frame member for attachment to said terminal; a plurality of push-buttons mounted in said frame member, the push-buttons being in a linear array; a plurality of programming members releasably mounted in said frame; said programming members with said push-buttons being in columns and rows, a push-button associated with each programming member; a plurality of recesses extending into each programming member from a bottom surface; a plurality of actuators removably mounted in said recesses; a plurality of actuating members on each actuator, the actuating members being positioned at preselected ones of a plurality of positions on each actuator; said actuating members being positioned to and contact certain ones of said plurality of contact points of said programmable circuit pattern thereby causing said circuit pattern to perform predetermined operations when said push-buttons are depressed.

11. A programming system as claimed in claim 10, said actuators arranged in columns and rows in each programming member.

12. A programming system as claimed in claim 11, said actuators arranged in two columns in each programming member.

13. A programming system as claimed in claim 12, said actuators arranged in four rows in each programming member.

14. A programming system as claimed in claim 10, including a circuit board, said circuit pattern on said circuit board.

15. A programming system as claimed in claim 14, said circuit board mounted on said frame member.

16. A programming system as claimed in claim 14, said circuit pattern including a plurality of paths, a path for each position of an actuating member.

17. A programming system as claimed in claim 14, said circuit pattern including a plurality of parallel paths, a path for each position of an actuating member.

18. A programming system as claimed in claim 17, each of said paths comprising a single conductor path.

19. A programming system as claimed in claim 18, said actuators mounted in said programming members in columns and rows, one conductor path associated with each column being connected to a ground terminal, one actuating member on each actuator making contact with said one conductor path and another actuating member on each actuator making contact with a preselected other one of said conductor paths, said actuator and said actuating members being of electrically conductive material.

20. A programming system as claimed in claim 17, each of said paths comprising two parallel conductor paths, an actuating member positioned to connect said two parallel conductor paths.

21. A programming system as claimed in claim 20, said actuators mounted in said programming members in columns and rows.

22. A programming system claimed in claim 23, including an elastomeric member extending over said paths between said actuating members and said circuit board; said plurality of contact points being on said elastomeric member, a contact point being associated with each path; an electrically conductive portion at each of said contact points, said actuating members positioned to push down preselected contact points on said elastomeric member and move the related conductive portions into contact with the associated path to connect the two parallel conductor paths.

23. A programming system as claimed in claim 10 including labelling means on each programming member.

24. A programming system as claimed in claim 10, including five preselectable positions on each actuator for said actuating members.

25. A programming system as claimed in claim 10, each of said programming members having a snap-in mounting in said frame member.

* * * * *